United States Patent [19]
Souchi et al.
[11] Patent Number: 4,532,687
[45] Date of Patent: Aug. 6, 1985

[54] DEVICE FOR ATTACHING A HOSE JOINT

[75] Inventors: Toshiyuki Souchi, Inazawa; Isoo Todaka, Aichi, both of Japan

[73] Assignee: Toyoda Gosei Co., Ltd., Nishikasugai, Japan

[21] Appl. No.: 489,673

[22] Filed: Apr. 28, 1983

[30] Foreign Application Priority Data

Apr. 28, 1982 [JP] Japan .................................. 57-72246

[51] Int. Cl.³ .............................................. B23P 19/02

[52] U.S. Cl. ........................................ 29/235; 29/237; 29/240

[58] Field of Search .......................... 29/237, 235, 240; 269/229, 270; 279/106, 107; 81/54, 57.33, 186

[56] References Cited

U.S. PATENT DOCUMENTS

| | | | |
|---|---|---|---|
| 1,094,978 | 4/1914 | Church | 29/237 |
| 2,367,672 | 1/1945 | DiCosmo et al. | 29/240 |
| 3,047,043 | 7/1962 | Albrecht | 29/237 |
| 3,590,457 | 7/1971 | Gustetic | 29/240 X |
| 3,787,950 | 1/1974 | Bagby | 29/237 |
| 3,877,689 | 4/1975 | Todd | 269/229 X |

*Primary Examiner*—Frederick R. Schmidt
*Assistant Examiner*—Steven P. Schad
*Attorney, Agent, or Firm*—Cushman, Darby & Cushman

[57] ABSTRACT

A device used for attaching a joint having a sleeve to one end of a hose body having a predetermined length before the joint is secured thereto by caulking, for example, during the manufacture of a brake hose. The device includes a chuck body which is rotatable about its own axis, and reciprocable along the longitudinal axis of the hose body. The chuck body has a stationary portion and a movable portion which are divided from each other by a plane passing through the longitudinal axis of the chuck body. The movable portion is reciprocally movable in a direction perpendicular to the plane mentioned above. The joint is chucked in axial alignment with the hose body when the movable portion is moved into contact with the stationary portion. The device is small, and enables a reduction in the time and labor required for the job in question.

1 Claim, 4 Drawing Figures

DEVICE FOR ATTACHING A HOSE JOINT

BACKGROUND OF THE INVENTION

1. Field of the Invention

This invention relates to a device used for attaching a joint having a sleeve to one end of a hose body having a predetermined length before the joint is connected thereto by caulking, for example, during the manufacture of a brake hose.

2. Description of the Prior Art

FIG. 1 shows a hose joint 1 having a sleeve 2 and a nipple 3 which define therebetween an annular space in which one end of a hose body H is fitted. When the end of the hose body is inserted into the annular space, the joint 1 is rotated so that the resistance to its insertion may be reduced. This job usually employs a pair of movable chuck portions which are opened or closed simultaneously, and involves a lot of difficulty in placing the joint in axial alignment with the hose body. Therefore, the job usually consists of two parts, i.e., first inserting the end of the hose body into the joint by about one-fourth of the length to be inserted without rotating the joint, and then transferring them to a different station and inserting the end of the hose body into the joint completely while rotating the joint. The job requires a large and expensive set of equipment which includes two separate apparatuses for the preliminary and final insertion of the hose into the joint and another apparatus for the transfer of the hose from one of the apparatuses to the other. The job also requires a lot of time and labor.

SUMMARY OF THE INVENTION

The device for attaching a hose joint according to this invention comprises a chuck body which is rotatable, and reciprocable along the longitudinal axis of the hose to which the joint is to be attached. The chuck body has a stationary portion and a movable portion which are divided from each other by a plane passing through its longitudinal axis. The movable portion is reciprocally movable to and away from the stationary portion to chuck the joint or release it. The device ensures chucking of the joint in axial alignment with the hose. This invention eliminates any preliminary insertion step or apparatus, and enables rotation of the joint throughout the job. The device of this invention is, thus, small and inexpensive, and the job requires only a small amount of time and labor.

DESCRIPTION OF THE PREFERRED EMBODIMENT

Figure 1:
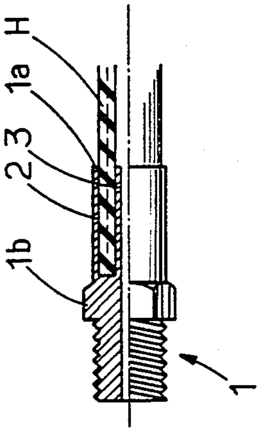
FIG. 1 is a fragmentary longitudinal sectional view showing a hose joint attached to one end of a hose.
Figure 2:
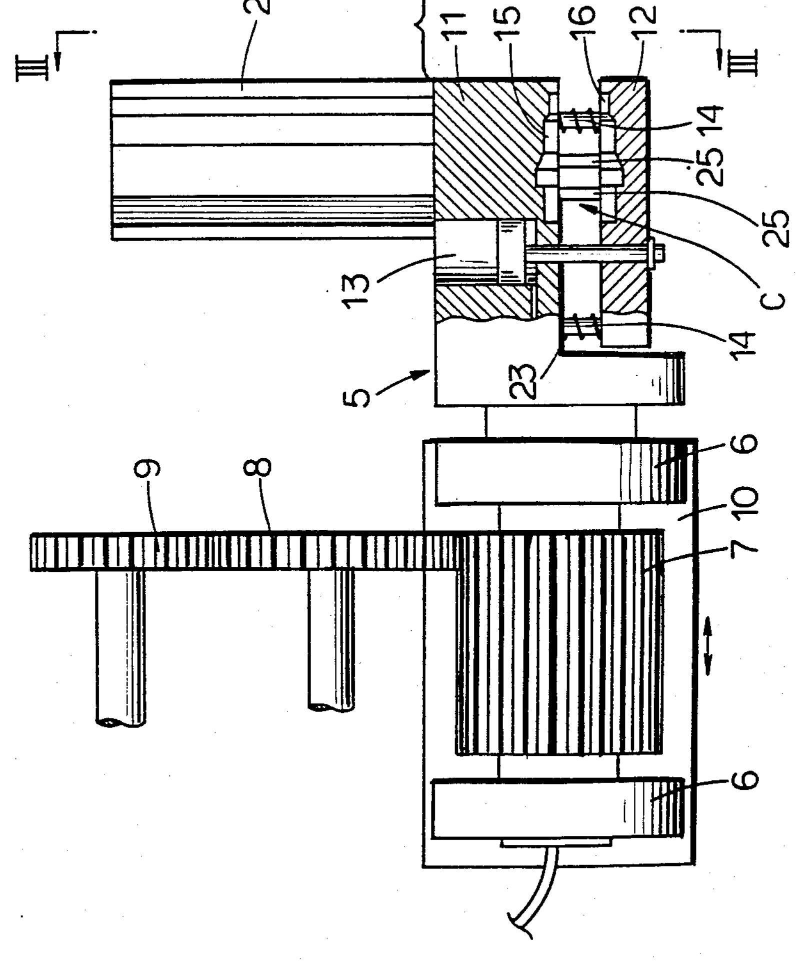
FIG. 2 is a top plan view, partly in section, of a device embodying this invention.
Figure 3:
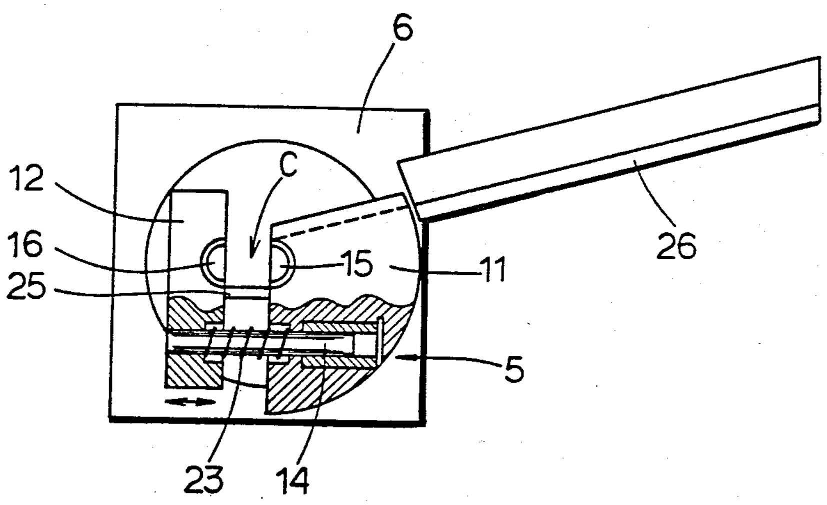
FIG. 3 is an enlarged side elevational view, partly in section, taken, along the line III—III of FIG. 2.
Figure 4:
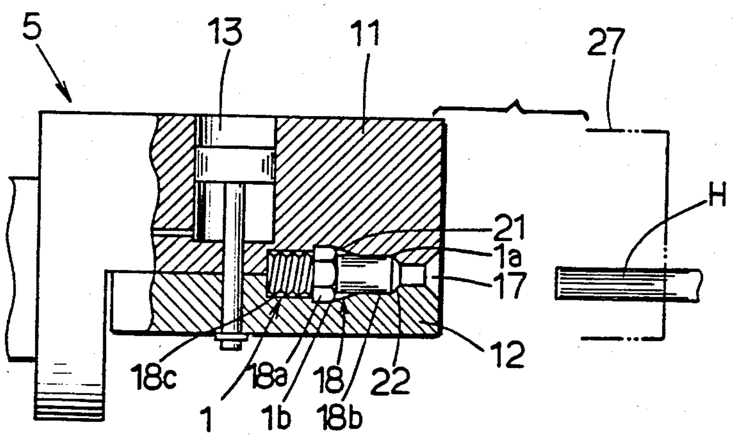
FIG. 4 is a fragmentary enlarged view, partly in section, of the device shown in FIG. 2, showing the chuck body in its closed position.

Referring to FIGS. 2 to 4 of the drawings, a device embodying this invention comprises a chuck body 5 which is rotatable by the output shaft of a driven gear 7 supported rotatably on unit bearings 6, and reciprocable by an air cylinder not shown with the driven gear 7, unit bearings 6 and a base 10. The gear 7 is engaged with an intermediate gear 8, and driven by a driving gear 9 which is connected to the output shaft of a motor not shown.

The chuck body 5 comprises a stationary portion 11 and a movable portion 12 which are divided from each other by a plane passing through its longitudinal axis. The movable portion 12 is reciprocally movable to and away from the stationary portion 11 by an air cylinder 13 in a direction perpendicular to the plane passing through the longitudinal axis of the chuck body. A pair of guide bars 14 are provided for the reciprocal movement of the movable portion 12. A pair of holding recesses 15 and 16 are provided in the mutually facing surfaces of the stationary and movable portions 11 and 12, respectively, and define a chucking portion C. When the chuck body 5 is in its closed position, they define a joint holding cavity 18 which is contiguous to a funnel-shaped hose guide cavity 17 defining an inlet for a hose, as shown in FIG. 4. The joint holding cavity 18 has a hexagonal holding portion 18*a* in its mid-portion, and a sleeve holding portion 18*b* and a threaded-end holding portion 18*c* on the opposite sides, respectively, of the hexagonal holding portion 18*a*. A first tapered shoulder 21 is defined between the hexagonal holding portion 18*a* and the sleeve holding portion 18*b*, and a second tapered shoulder 22 between the sleeve holding portion 18*b* and the hose guide cavity 17. The shoulders 21 and 22 ensure proper setting of the joint 1 in the holding cavity 18 even if the joint has been delivered with axial deviation into the chucking portion C, and also facilitates the opening and retraction of the chuck body 5 without having any interference with the edge 1*a* of the sleeve portion of the joint 1 or the edge 1*b* of its hexagonal portion after the joint 1 has been attached to one end of a hose body H. The hexagonal holding portion 18*a* facing the movable portion 12 has a recess which is complementary to the hexagonal portion of the joint so that the joint may not be rotated in the holding cavity 18 when the chuck body is in its closed position. A coiled spring 23 surrounds each guide bar 14 between the stationary and movable portions 11 and 12 of the chuck body. A pair of supporting bars 25 are provided immediately below the chucking portion C in such a manner that they may not hinder the movement of the movable portion 12. The supporting bars 25 are provided for preventing the joint 1 from falling when the chuck body 5 is in its open position. A chute 26 is provided for enabling the joint 1 to be automatically fed by gravity into the chucking portion C of the chuck body 5.

In operation, the hose body H is brought by a belt conveyor or the like to a position in which it is axially aligned with the chuck body 5, i.e., its stationary portion 11, and secured against any longitudinal or horizontal displacement. The joint 1 is fed by rolling or sliding along the chute 26, falls onto the supporting bars 25, and stays in the chucking portion C. The air cylinder 13 is actuated to move the movable portion 12 toward the stationary portion 11 to close the chuck body 5 whereby the joint 1 is held unrotatably in the holding cavity 18. It is only the movable portion 12 that is moved, and it is moved toward the stationary portion 11 of which the longitudinal axis is fixed. Therefore, the joint 1 is held exactly in axial alignment with the hose body H. Then, the hydraulic cylinder and the motor, which are not shown, are actuated to move the chuck body 5 to its front dead point 27, while rotating it. The hose body H is smoothly inserted into the annular space defined between the sleeve and nipple portions 2 and 3 of the joint 1, since the joint 1 is held in axial alignment with the hose body H. Even if the joint 1 is somewhat axially deviated relative to the hose body H, it is completely absorbed by the hose guide cavity 17, and does not present any problem. For the smooth insertion of the hose into the joint, it is preferable to design the chuck body 5 for rotation at a variable speed which is appropriate to overcome the resistance to such insertion.

If the joint 1 has been connected to the hose body H, the compressed air is removed from the air cylinder 13, and the movable portion of the chuck body 5 is moved away from the stationary portion 11 by the action of the coiled springs 23. The hydraulic cylinder is actuated to retract the chuck body 5 without rotating it. The assembly of the joint 1 and the hose body H is transferred by an appropriate conveying device to a caulking station.

Although the invention has been described for attaching a joint to one end of a hose, a pair of devices are oppositely disposed for simultaneous operation in the event joints are attached to both ends of a hose. Although a chute has been shown for feeding the joint, it is equally possible to use other means, such as a transfer unit having a work chuck.

What is claimed is:

1. In a device for attaching a hose joint having a sleeve to one end of a hose body having a predetermined length before the joint is secured thereto by caulking, the improvement which comprises:

a chuck body which is rotatable about its own axis, and reciprocable along the longitudinal axis of the hose body;

said chuck body having a stationary portion and a movable portion which are divided from each other by a plane passing through the longitudinal axis of said chuck body;

said movable portion being reciprocally movable in a direction perpendicular to said plane, whereby the joint can be chucked in axial alignment with the hose body;

a pair of symmetric holding recesses being formed in the mutually facing surfaces of said stationary and movable portions, respectively, and defining a chucking portion, in which the movement of said movable portion into contact with said stationary portion defines a joint holding cavity which is contiguous to a funnel-shaped hose guide cavity defining an inlet for the hose body;

said joint holding cavity having a hexagonal holding portion in its mid-portion and a sleeve holding portion and a threaded-end holding portion on the opposite sides, respectively, of said hexagonal holding portion;

said holding cavity having a first tapered shoulder defined between said hexagonal holding portion and said sleeve holding portion, and a second tapered shoulder between said sleeve holding portion and said hose guide cavity.

* * * * *